March 27, 1962 H. ZABEL 3,026,752
RADIUS TURNING TOOL HOLDER
Filed July 15, 1959 3 Sheets-Sheet 1
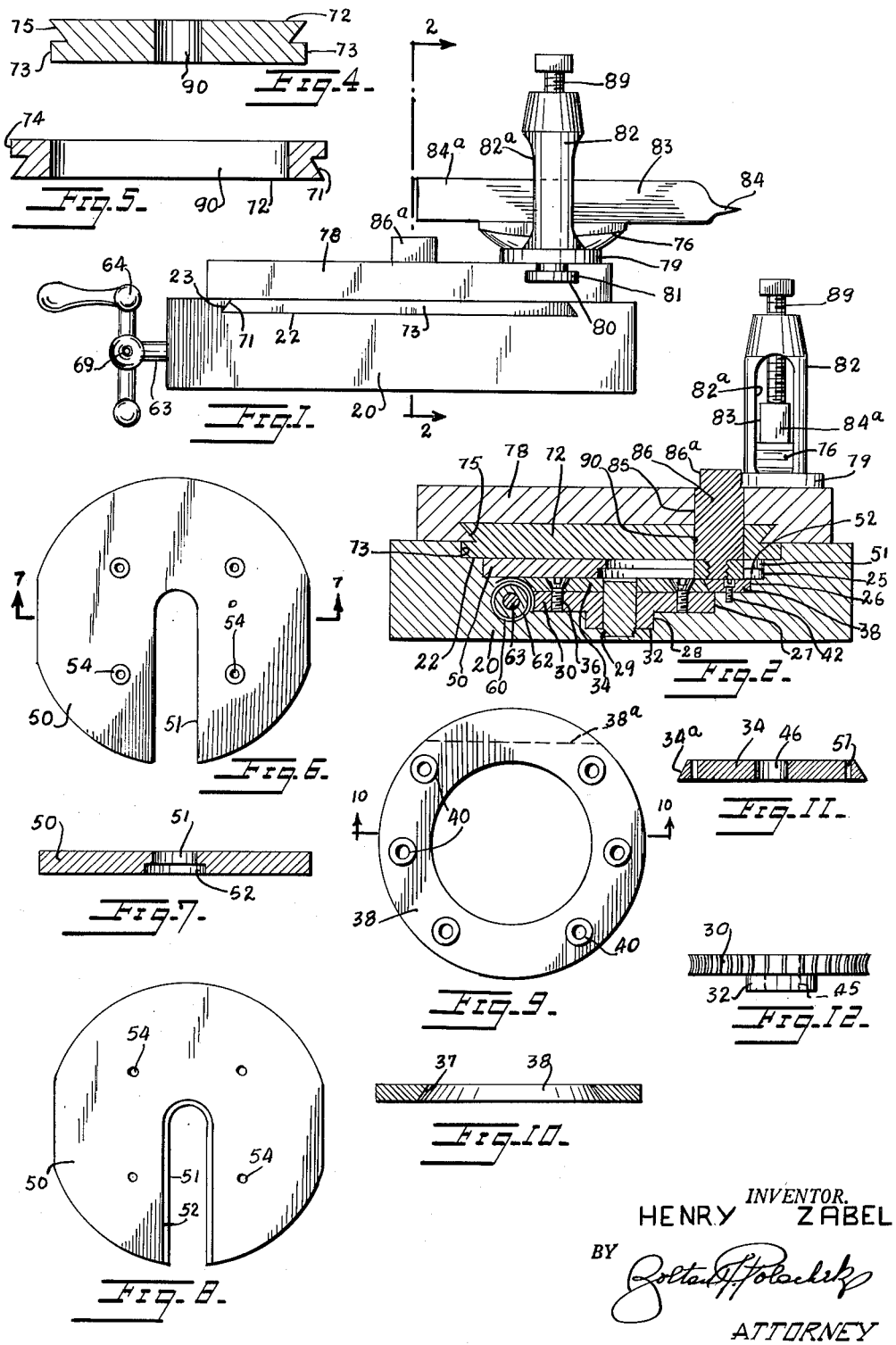
INVENTOR.
HENRY ZABEL
BY
ATTORNEY March 27, 1962 H. ZABEL 3,026,752
RADIUS TURNING TOOL HOLDER
Filed July 15, 1959 3 Sheets-Sheet 2

INVENTOR.
HENRY ZABEL
BY
ATTORNEY

March 27, 1962 H. ZABEL 3,026,752
RADIUS TURNING TOOL HOLDER
Filed July 15, 1959 3 Sheets-Sheet 3
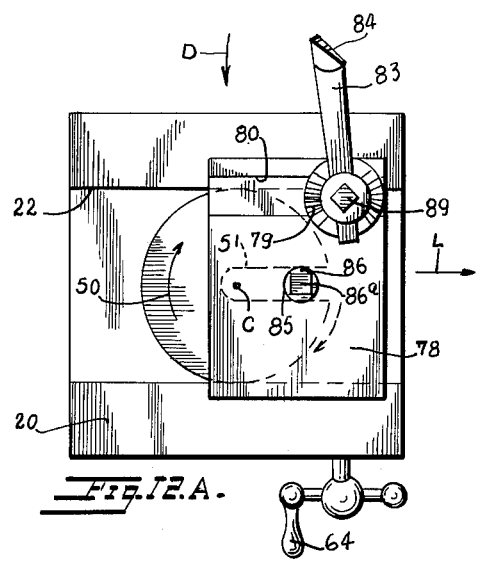
Fig. 12.A.
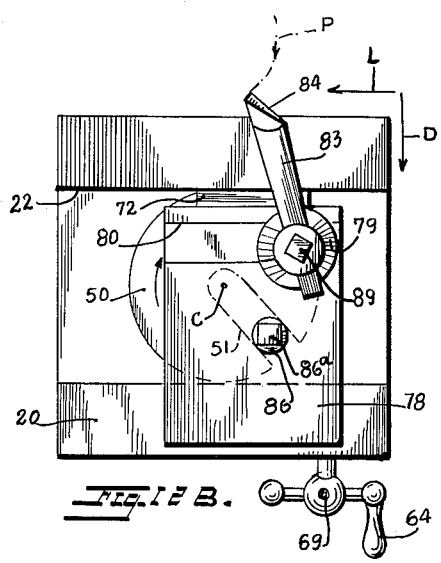
Fig. 12.B.
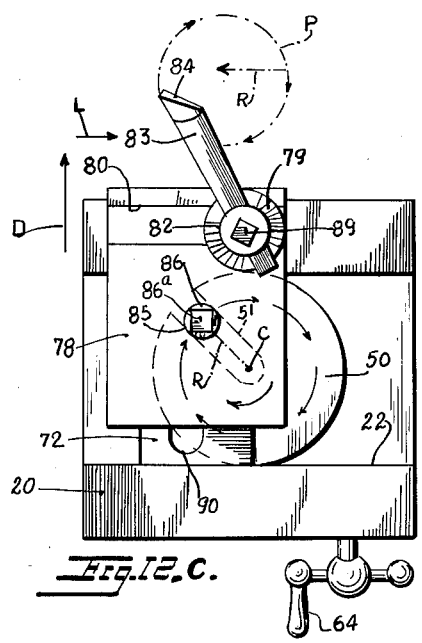
Fig. 12.C.
INVENTOR.
HENRY ZABEL
BY
ATTORNEY

United States Patent Office 3,026,752
Patented Mar. 27, 1962

3,026,752
RADIUS TURNING TOOL HOLDER
Henry Zabel, 2714 Paulding Ave., Bronx, N.Y.
Filed July 15, 1959, Ser. No. 827,200
1 Claim. (Cl. 82—12)

This invention relates to the art of machine tools and particularly concerns a tool holder for radius turning.

According to the invention there is provided a movable tool holding platform slidably mounted on a dovetail plate. This dovetail plate is slidable on a dovetail grooved base plate. In order to slide the platform, dovetail plate and base plate relative to each other in orthogonal directions there is provided a drive pin extending through a slot in the dovetail plate and through an aperture in the platform. The drive pin is engaged with a nut slidable in a T-slot of a drive plate secured to a worm gear. The worm gear is driven by a worm rotated by a crank external of the base plate. The tool holder and cutting or turning tool can be positioned anywhere along a T-slot on the tool holding platform. The drive pin can be locked in position anywhere on the T-slot of the drive plate to set the radius of rotation of the drive pin and platform. The platform is constrained by the dovetail plate to orthogonal motion with respect thereto. The cutting tool duplicates the circular motion imparted to the drive pin and drive plate, thereby cutting a curve on work being machined by the tool. The tool holder permits the tool to cut convex and concave arcs with conventional turning tools and boring bars. A principal advantage of the present invention is that the cutting edge of the tool is moved in a circular path without rotating or turning the tool itself at the center of the circle being turned. This permits the tool to work up close to a lathe chuck or other work holder. Since the tool itself moves only longitudinally and laterally without itself turning, it can be of any desired length and have different cutting edges at opposite ends.

It is therefore a principal object of the invention to provide a tool holder including a platform mounted to move a tool in longitudinal and lateral directions while a cutting edge of the tool moves circularly.

A further object is to provide a turning attachment for a machine tool, in which a cutting tool is adjustably mounted on a platform supported on a dovetail plate for sliding in one direction with respect to the plate, the dovetail plate being mounted on a dovetail grooved base and slidable with respect to the plate in a direction perpendicular to the direction of movement of the platform.

A still further object is to provide a turning attachment of the character described employing a worm drive for turning a drive pin engaged in a slot of the dovetail plate and a hole in the platform to effect mutually perpendicular movement of the dovetail plate and platform.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

FIG. 1 is an elevational view of a tool holder embodying the invention.

FIG. 2 is a sectional view taken on line 2—2 of FIG. 1.

FIGS. 4 and 5 are central transverse and longitudinal sectional views respectively of the dovetail plate shown in FIG. 3.

FIG. 6 is a top plan view of the drive plate.

FIG. 7 is a sectional view taken on line 7—7 of FIG. 6.

FIG. 8 is a bottom plan view of the drive plate.

FIG. 9 is a top plan view of a bearing ring employed in the device.

FIG. 10 is a sectional view taken on line 10—10 of FIG. 9.

FIG. 11 is a central sectional view of a bearing plate.

FIG. 12 is a side elevational view of the worm gear.

FIGS. 12A, 12B and 12C are top plan views of the device showing different positions of the platform and cutting tool.

Figure 3:
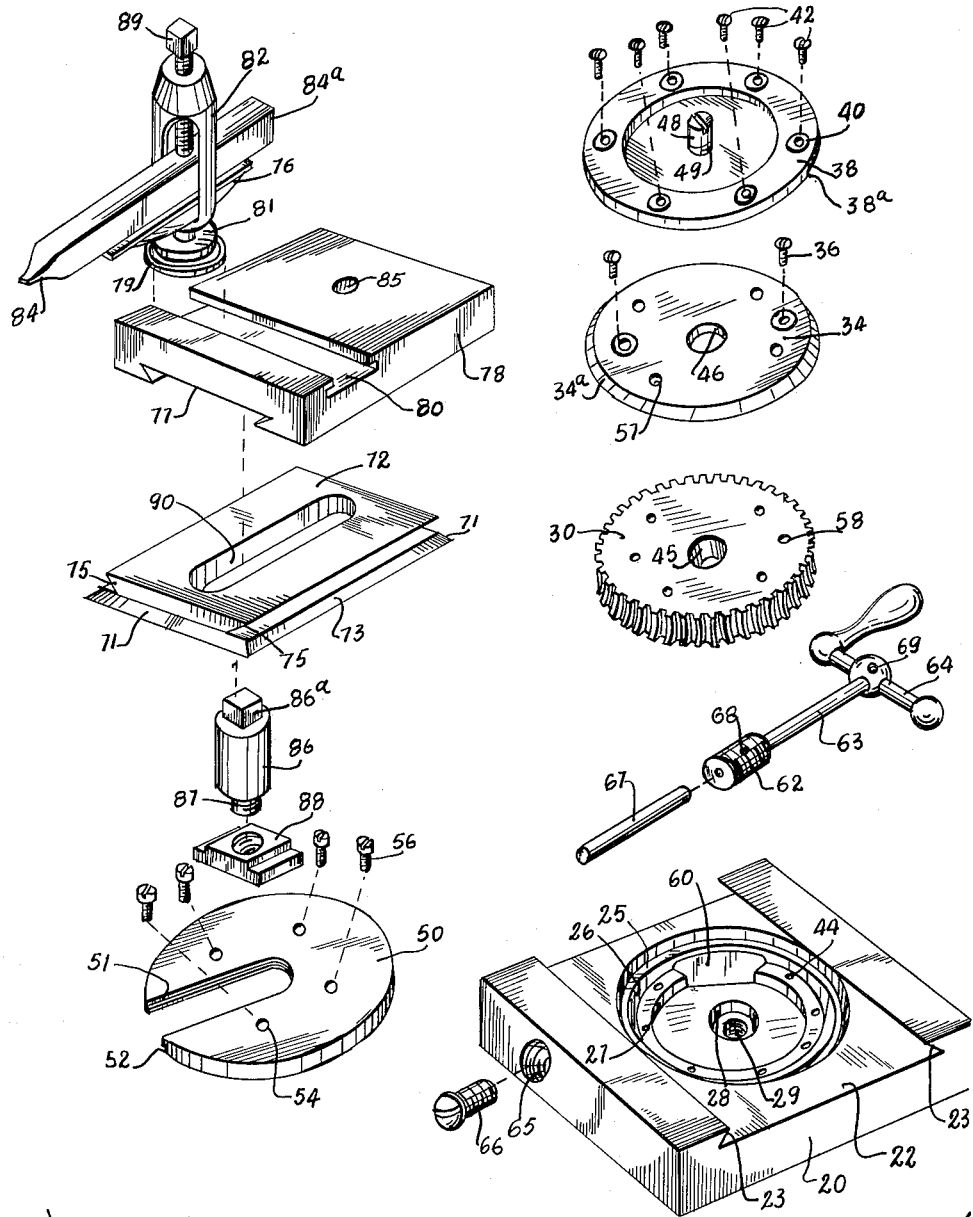
FIG. 3 is an exploded perspective view of the parts of the tool holder.

Referring to FIGS. 1–12, there is shown a rectangular base plate 20 formed with an upper dovetailed groove 22. The plate is formed with a center well having successive stepped bores 25—29 of progressively smaller diameter downwardly. The lowermost bore 29 is internally threaded. The well is centrally located in the base plate and receives the several components shown best in FIGS. 2 and 3. A worm gear 30 has a depending boss 32 shown in FIGS. 2 and 12, which fits into bore 28 while the body of the gear fits into bore 27. A circular bearing plate 34 is secured to the gear 30 by screws 36. This plate has a beveled edge 34ª which fits into the beveled interior 37 of a flat bearing ring 38 shown in FIG. 10. Ring 38 has countersunk holes 40 which receive flathead screws 42. These screws engage in threaded holes 44 in the bottom of bore 26 and hold the ring stationary therein. The gear 30 and plate 34 rotate together. They have registering central holes 45, 46 through which extends a cylindrical guide pin 48 having a lower threaded end 49 which is secured in the threaded bore 29.

A substantially circular drive plate 50 fits into bore 25. This plate has a radially extending T-slot 51 undercut at 52 at the underside of plate 50 as clearly shown in FIGS. 7 and 8. Plate 50 has counterbored holes 54 for receiving the heads of screws 56 whose shanks pass through holes 57 in plate 34 and screw into threaded holes 58 in the worm gear 30. A transverse bore 60 is formed in the base plate in which rotates worm 62. The worm is connected to a shaft 63 which is turned by crank 64 outside one end of the base. Bore 60 extends through the base plate and is threaded at 65 at the other end of the base to receive a screw 66 for holding cylindrical pin 67 in the bore. This pin prevents longitudinal movement of the worm in the bore 60. Worm 62 is removably connected to shaft 63 by a setscrew 68. Ring 38 is undercut at 38ª to provide space for worm 62. Crank 64 is adjustably held by setscrew 69 on shaft 63.

In the groove 22 is slidably fitted the lower dovetail portion of dovetail plate 72. The opposite edges 71 of this lower portion are inclined with respect to the bottom of the plate to fit the inclined sides 23 of groove 22. The end edges 73 of this lower portion are perpendicular to the flat bottom and top of the plate, as shown in FIG. 4. The upper portion of plate 72 has beveled edges 75 forming another dovetail portion adapted to fit into a dovetail groove 77 at the underside of platform plate 78. The other edges 74 of the upper portion of plate 72 are vertical and perpendicular to the flat bottom and top of the plate. A transverse inverted T-slot or groove 80 is formed in the top of plate 78. This slot is adapted to receive flange 81 formed at the bottom of a tool holder post 82. The post has an elongated bore 82ª through which extends the removable tool bar 83 having at least one cutting edge 84.

An adjustable screw 89 in post 82 presses the cutter bar 83 down on a spacer member 76 in the bore 82ª, and a spacer ring 79 which abuts the top of the platform. Ring 79 supports member 76. The opposite end 84ª of the cutter bar may also be formed with a cutting edge. Platform plate 78 has a central hole 85 in which is rotatably fitted a cylindrical drive pin 86. The pin has a square head 86ª. The lower end of the pin is threaded at 87 and engages in a T-nut 88 slidably disposed in the T-slot 51 in drive plate 50. The pin passes through an elongated slot 90 formed in the dovetail plate 72.

FIGS. 12A–12C illustrate the circular path P of radius R traversed by the cutting edge 84 of the tool bar 83 as the crank handle 64 is turned to turn drive plate 50. Platform 78 moves in a circular path since the rotating drive pin 86 extends through the central hole 85 in the platform. In order to prevent rotation of the plate while guiding it to revolve in a circular orbit, it is constrained by the dovetail plate 72 which permits the platform to move outwardly or laterally only in direction D with respect to the dovetail plate and base plate, and at the same time the dovetail plate carries the platform in longitudinal directions L on the base plate. The mutually orthogonal movements of the dovetail plate and platform define a rectangular coordinate movement system which permits the platform to revolve in planetary fashion circularly without rotating on its center. Thus the tool bar 83 always presents its cutting edge forwardly so that it can make a convex or concave cut on the work depending on how the work is presented to it. The radius R of path P equals the radial distance R' from the center C of plate 50 to the center of pin 86.

The device will be mounted on the usual vise of a lathe or other machine tool and the work presented to the cutting bar will be turned on its supporting chuck. The operator will adjust the position of the cutting edge 84 of the bar as required by operation of the crank handle 64.

While I have illustrated and described the preferred embodiment of my invention, it is to be understood that I do not limit myself to the precise construction herein disclosed and that various changes and modifications may be made within the scope of the invention as defined in the appended claim.

Having thus described my invention, what I claim as new, and desire to secure by United States Letters Patent is:

A turning attachment for a machine tool, comprising a base plate, a cutter bar having a cutting edge, a platform plate slidably mounted on the base plate including means for adjustably supporting said bar with said edge projecting beyond the platform, said platform plate having a first dovetail groove, a dovetail plate having a first portion engaged and slidable in said groove, said base plate having another dovetail groove oriented perpendicular to the first groove, said dovetail plate having another portion engaged and slidable in the other groove, and means for moving the dovetail plate and platform plate in mutually orthogonal directions while said cutting edge traverses a circular path including, a rotatable worm, a worm gear engaged with said worm, a drive plate secured to said gear, said drive plate having a radial slot, a nut slidable in said radial slot, a drive pin having an end engageable with said nut to lock the nut and pin a selected radial distance from the center of said drive plate, said pin extending perpendicularly to said drive plate, said dovetail plate having a longitudinal slot, said platform plate having a central hole, said pin passing through said longitudinal slot and hole, whereby rotation of said worm turns said pin in a circle, while said platform plate is revolved in a circular path outside of the circular path of said cutting edge, said nut being T-shaped in cross section, said radial slot being correspondingly T-shaped.

References Cited in the file of this patent

UNITED STATES PATENTS

| | | |
|---|---|---|
| 2,465,393 | Obadiah | Mar. 29, 1949 |
| 2,623,286 | Barker | Dec. 30, 1952 |
| 2,715,848 | Schmidt | Aug. 23, 1955 |